April 21, 1931. O. W. PHIFER 1,802,124
LUBRICANT LEVEL GAUGE
Filed March 22, 1926
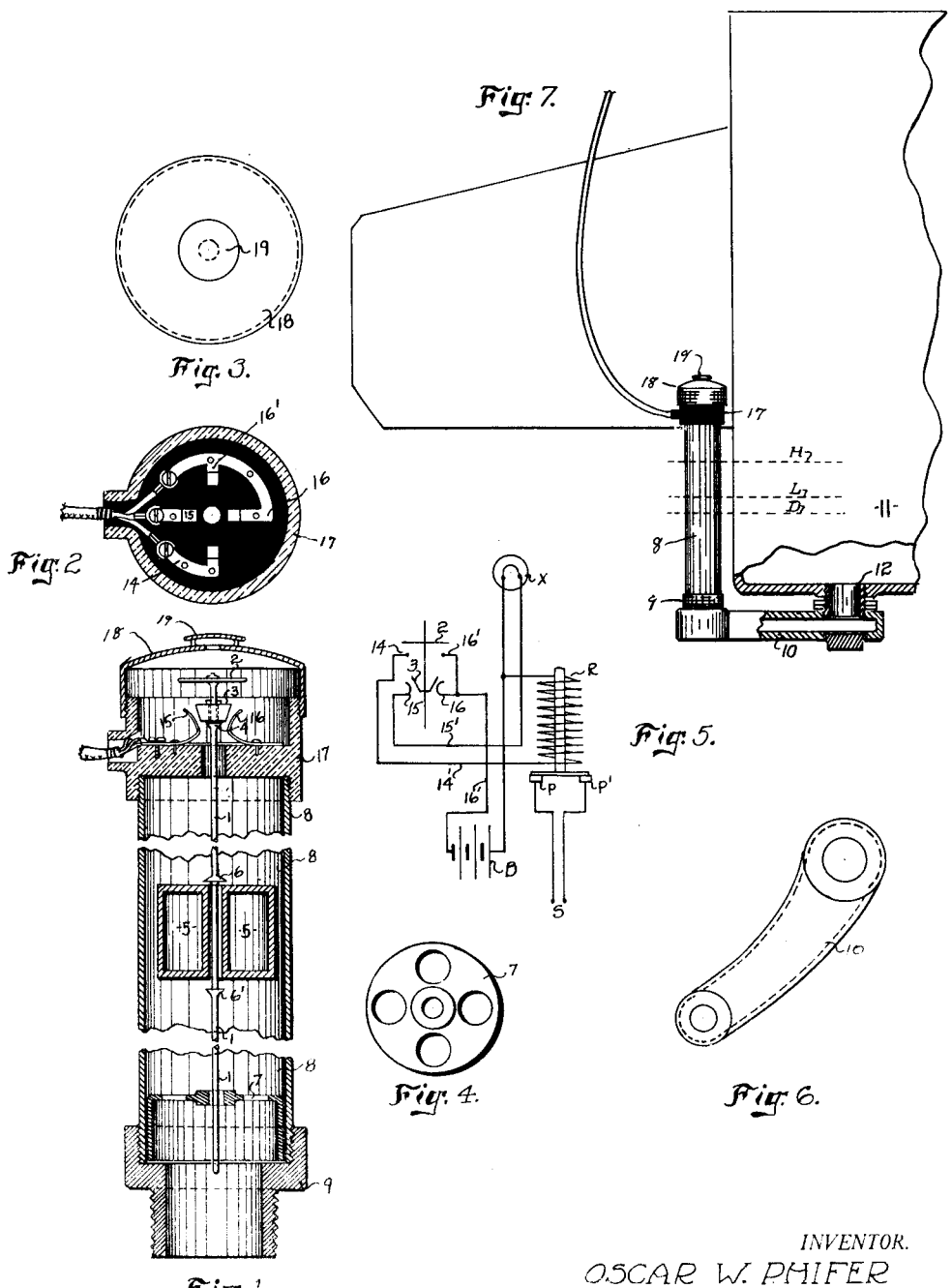
INVENTOR.
OSCAR W. PHIFER
BY U.G.Charles
ATTORNEY.

Patented Apr. 21, 1931

1,802,124

UNITED STATES PATENT OFFICE

OSCAR W. PHIFER, OF TOPEKA, KANSAS

LUBRICANT-LEVEL GAUGE

Application filed March 22, 1926. Serial No. 96,565.

My invention relates to lubricant level gauges for internal combustion engines in which electrical contacts energize certain signals and relays contingent with the level of the oil in the crank case or oil reservoir of the engine.

The objects of my invention are

First; to provide a signaling means to indicate that the level of the oil is below the point for proper lubrication.

Second; to provide a means of stopping the engine when the oil level has reached what may be considered the danger point.

Referring to the drawings, which are a part of the specification.

Fig. 1 is a vertical section of the float chamber and contacts.

Fig. 2 is a horizontal section of the contact chamber.

Fig. 3 is a plan view of the contact chamber cap.

Fig. 4 is a plan view of the float and stem guide, which also serves as a baffle.

Fig. 5 is a wiring diagram showing the schematic arrangement of the contacts, signal and stopping means.

Fig. 6 is a plan view of the supporting arm functioning as a duct.

Fig. 7 shows my invention in position on the crank case of an internal combustion engine, parts removed for the purpose of illustration.

Referring to the drawings in detail, 1 is a float stem position as shown with the disc contact 2 at its upper extremity and the conical contact 3 slidably mounted but limited in its downward movement by the obstruction 4. The float 5 is positioned at a midpoint of the stem and so held by the obstructions 6 and 6'; 7 is a guiding means for the lower extremity of the float and stem and serves further as a baffle means to the fluctuation of the oil in the tube 8, which has at the bottom a male connection 9 arranged to screw into the hollow supporting arm 10 which in turn is connected to the crank case 11 by means of a nipple 12 at the drain plug aperture. The drain plug 13 is removed from the crank case and placed in the supporting arm as shown.

Connected to the contact points 14, 15 and 16 are the insulated wires 14', 15' and 16' respectively, (by means of terminal screws as shown) positioned in the shape and manner illustrated on contact block 17, the material of which is dielectric or insulating in its composition. The metal cap 18 has a ventilator 19 concentrically positioned functioning as a breather.

The operation of my invention is as follows:

Referring to Fig. 7 where my invention is shown in position the dotted lines H, L, and D represent three different levels of oil in the crank case; high, low, and dangerously low respectively. These levels are duplicated in the float chamber 8 by means of the hollow supporting arm 10. The float 5 is positioned on the stem at such a point that the closing means 2 and 3 are held above the contact points where the oil level is at the point indicated by the dotted line H. After the level of the oil has reached the point indicated by the dotted line L the float and stem have dropped downward allowing the conical member 3 to make a wiping contact on the points 15 and 16 which close the circuit through the lamp X. The lamp X is preferably mounted on the instrument board of an automobile if such is the use of the engine considered, or the lamp X may be placed in a permanent position in case of a stationary use of the engine in order that the parties responsible for operation may know that the oil is at a low level and should be replenished. However assuming that the warning signal as indicated by the lamp X is ignored and operation is continued without the addition of more lubricant and that the oil drops to the dangerously low level indicated at D. When this level is reached the float stem carried downward by the weight of the float, slides through the member 3 until the disc 2 lies across the contact points 14 and 16' which action energizes the relay R. Then the raising of the plunger opens the circuit S at the points P and P'. The circuit S is to be placed in series with the ignition switch of the engine and the opening of this circuit results in the stopping of the engine, thereby preventing a burnout of the parts in bearing.

Such modifications may be employed as lie within the scope of the appended claim.

Having thus described my invention, what I claim as new and desire to secure by Letters Patent is:—

In a float switch for lubricant level gauges of the kind described, a rod, a float member positioned on the rod at an intermediate portion, two contact members positioned one above the other on the upper extremity of the rod, the upper contact member being a disc and the lower contact member being conical in shape, spring contact fingers for engagement with the lower contact member and rigid contact fingers for engagement with the upper contact member, the lower contact member engaging the spring fingers at a certain level of liquid and the upper contact member engaging the rigid contact fingers at a low level of the liquid.

OSCAR W. PHIFER.